(12) United States Patent
Kodera

(10) Patent No.: US 10,807,637 B2
(45) Date of Patent: Oct. 20, 2020

(54) STEERING CONTROL DEVICE

(71) Applicant: JTEKT CORPORATION, Osaka-shi, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/255,395

(22) Filed: Jan. 23, 2019

(65) Prior Publication Data

US 2019/0233003 A1 Aug. 1, 2019

(30) Foreign Application Priority Data

Jan. 30, 2018 (JP) ................................. 2018-014082

(51) Int. Cl.
*A01B 69/00* (2006.01)
*B62D 6/00* (2006.01)
(Continued)

(52) U.S. Cl.
CPC ............... *B62D 6/00* (2013.01); *B62D 6/008* (2013.01); *B62D 15/025* (2013.01);
(Continued)

(58) Field of Classification Search
CPC ........ B62D 6/00; B62D 6/008; B62D 15/025; B62D 5/046; B62D 6/04; B62D 6/08;
(Continued)

(56) References Cited

U.S. PATENT DOCUMENTS

| 5,774,819 A | 6/1998 | Yamamoto et al. |
| 2008/0047775 A1 | 2/2008 | Yamazaki |

(Continued)

FOREIGN PATENT DOCUMENTS

| DE | 195 27 334 A1 | 2/1996 |
| DE | 10 2011 052881 A1 | 2/2013 |

(Continued)

OTHER PUBLICATIONS

English Translation for JP2014148299A.*
(Continued)

*Primary Examiner* — Mahmoud S Ismail
(74) *Attorney, Agent, or Firm* — Oliff PLC

(57) ABSTRACT

A control device controls a reaction force motor that generates a steering reaction force to be applied to a steering mechanism of a vehicle, based on a steering reaction force command value calculated according to a steering state. An axial force distribution calculation circuit of the control device calculates a mixed axial force by summing values obtained by multiplying an ideal axial force and estimated axial forces by individually set distribution rates. The axial force distribution calculation circuit calculates a final axial force to be reflected in the steering reaction force command value, by summing values obtained by multiplying the ideal axial force and the mixed axial force by individually set distribution rates. The axial force distribution calculation circuit sets the distribution rates of the ideal axial force and the mixed axial force, based on a distribution command generated by the host control device when intervening in steering control.

4 Claims, 6 Drawing Sheets

(51) Int. Cl.
  *B62D 11/00* (2006.01)
  *B62D 12/00* (2006.01)
  *B63G 8/20* (2006.01)
  *B63H 25/04* (2006.01)
  *G05D 1/00* (2006.01)
  *G06F 7/00* (2006.01)
  *G06F 17/00* (2019.01)
  *B62D 15/02* (2006.01)
  *B62D 5/04* (2006.01)
  *B60W 40/109* (2012.01)

(52) U.S. Cl.
  CPC ..... *B60W 40/109* (2013.01); *B60W 2520/125* (2013.01); *B60W 2520/14* (2013.01); *B62D 5/046* (2013.01)

(58) Field of Classification Search
  CPC .............. B62D 5/04; B60W 40/109; B60W 2520/125; B60W 2520/14
  USPC ...................................... 701/41, 42; 180/443
  See application file for complete search history.

(56) References Cited

U.S. PATENT DOCUMENTS

2014/0163822 A1    6/2014  Strecker et al.
2018/0057048 A1*   3/2018  Joyce ................. B62D 5/0484

FOREIGN PATENT DOCUMENTS

| JP | 2014-148299 A |   | 8/2014 |
| JP | 2014148299 A | * | 8/2014 |
| KR | 20130133327 A | * | 12/2013 |

OTHER PUBLICATIONS

English Translation for KR20130133327A.*
Jun. 26, 2019 Search Report issued in European Patent Application No. 19154217.4.

* cited by examiner

STEERING CONTROL DEVICE

INCORPORATION BY REFERENCE

The disclosure of Japanese Patent Application No. 2018-014082 filed on Jan. 30, 2018 including the specification, drawings and abstract, is incorporated herein by reference in its entirety.

BACKGROUND OF THE INVENTION

1. Field of the Invention

The present invention relates to a steering control device.

2. Description of Related Art

In the related art, there is known a so-called steer-by-wire steering system in which power transmission is mechanically disconnected between a steering wheel and steered wheels. This steering system includes a reaction force motor serving as a source of a steering reaction force to be applied to a steering shaft, and a steering operation motor serving as a source of a steering operation force for turning steered wheels. When the vehicle travels, a control device of the steering system performs reaction force control that causes the reaction force motor to generate a steering reaction force, and performs steering operation control to turn the steered wheels via the steering operation motor.

In the steer-by-wire steering system, since the power transmission is mechanically disconnected between the steering wheel and the steered wheels, a road surface reaction force applied to the steered wheels is hardly transmitted. Therefore, the driver hardly recognizes the road conditions through the steering reaction force (response) felt in their hands from the steering wheel.

In view of the above, for example, a steering control device disclosed in Japanese Patent Application Publication No. 2014-148299 (JP 2014-148299 A) calculates a feedforward axial force representing an ideal rack axial force based on a steering angle, and a feedback axial force representing an estimated axial force based on the state quantities of the vehicle (lateral acceleration, steered current, and yaw rate). The steering control device calculates a final axial force, by summing values obtained by multiplying the feedforward axial force and the feedback axial force by predetermined distribution rates, and controls a reaction force motor based on the final axial force. The feedback axial force reflects the road conditions (road surface information), and therefore a steering reaction force generated by the reaction force motor also reflects the road conditions. Accordingly, the driver can recognize the road conditions through the steering reaction force.

Development of driving assist systems that provide various driving assist functions for improving the safety or convenience of vehicles has been under way. In recent years, development of automated driving systems that provide an automated driving function such that the systems replace human drivers has become active. A control device of a driving assist system or an automated driving system (hereinafter referred to as a "host control device") acquires an optimum control method based on the vehicle state of each moment, and provides control commands individually to the control devices of onboard systems according to the acquired control method. A steering control device controls driving of a reaction force motor and a steering operation motor based on a command value generated by the host control device.

The following concerns arise when the vehicle is equipped with a driving assist system or an automated driving system. For example, the steering reaction force generated by a reaction force motor affects the behavior of the steering wheel. Therefore, the demand with respect to reaction force control performed by a steering control device when the driver manually drives the vehicle is often different from that when driving assist or automated driving is performed. However, in the steering control device disclosed in JP 2014-148299 A, for example, the feedback axial force based on the state quantities of the vehicle when the driver manually drives the vehicle and the feedback axial force based on the state quantities of the vehicle when the host control device intervenes in steering are calculated in the same manner, so that the road conditions are always reflected in the steering reaction force to be generated by the reaction force motor in the same manner. Accordingly, the steering reaction force and hence the behavior of the steering wheel according to the demand when the host control device intervenes in steering may not be obtained.

SUMMARY OF THE INVENTION

An object of the present invention is to provide a steering control device capable of appropriately responding to intervention in steering by a host control device.

According to an aspect of the present invention, there is provided a steering control device that controls a motor serving as a source of a driving force to be applied to a steering mechanism of a vehicle, based on a command value calculated in accordance with a steering state, the steering control device including: an axial force calculation circuit that calculates a plurality of axial forces to be applied to a steered shaft, based on a plurality of state quantities; and a distribution calculation circuit that calculates a final axial force to be reflected in the command value, by summing values obtained by multiplying the plurality of axial forces by individually set distribution rates. The distribution calculation circuit sets the distribution rates of the plurality of axial forces, based on a distribution command that is generated by a host control device when the host control device intervenes in steering control.

The demand with respect to a driving force to be generated by the motor when the host control device intervenes in steering control is often different from that when the host control device does not intervene in steering control. With the above configuration, since the distribution rates of the plurality of axial forces are set based on the distribution command that is generated by the host control device, the final axial force to be reflected in the command value when the host control device intervenes in steering control is different from that when the host control device does not intervene in steering control. That is, when the host control device intervenes in steering control, the driving force to be generated by the motor is changed in accordance with the distribution command. Accordingly, it is possible to appropriately respond to intervention in steering control by the host control device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a first embodiment will be described. In the first embodiment, a steering control device according to the present invention is applied to a steer-by-wire steering system.

Figure 1:
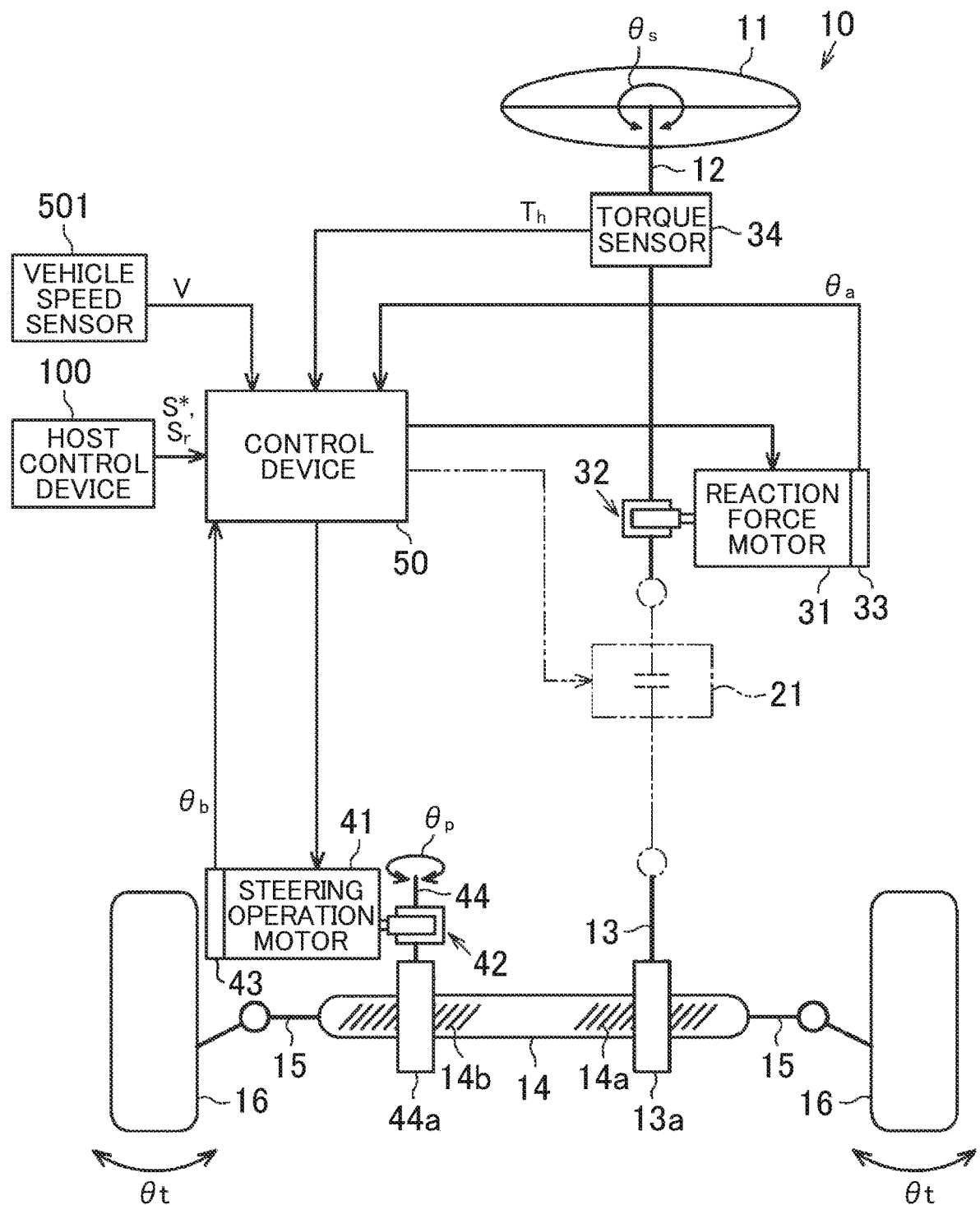
FIG. 1 is a configuration diagram illustrating a steer-by-wire steering system equipped with a steering control device according to a first embodiment mounted thereon.

As illustrated in FIG. 1, a steering system 10 for a vehicle includes a steering shaft 12 coupled to a steering wheel 11. The steering shaft 12 forms a steering mechanism. The steering system 10 further includes a steered shaft 14 extending in a vehicle width direction (lateral direction in FIG. 1). Right and left steered wheels 16 are coupled to the opposite ends of the steered shaft 14 via tie rods 15. When the steered shaft 14 moves linearly, a steered angle θt of the steered wheels 16 is changed.

In the following, a reaction force unit serving as a structure for generating a steering reaction force will be described. The steering system 10 includes, as a structure for generating a steering reaction force, a reaction force motor 31, a speed reduction mechanism 32, a rotation angle sensor 33, and a torque sensor 34. The term "steering reaction force" as used herein refers to a force (torque) applied in the direction opposite to the direction in which the driver operates the steering wheel 11. By applying the steering reaction force to the steering wheel 11, it is possible to provide an appropriate response to the driver.

The reaction force motor 31 is a source of a steering reaction force. The reaction force motor 31 used herein is, for example, a three-phase (U, V, and W) brushless motor. The reaction force motor 31 (to be more precise, a rotary shaft thereof) is coupled to the steering shaft 12 via the speed reduction mechanism 32. The speed reduction mechanism 32 is disposed at the steering wheel 11 side with respect to the clutch 21 on the steering shaft 12. The torque of the reaction force motor 31 is applied as a steering reaction force to the steering shaft 12.

The rotation angle sensor 33 is provided on the reaction force motor 31. The rotation angle sensor 33 detects a rotation angle $θ_a$ of the reaction force motor 31. The rotation angle $θ_a$ of the reaction force motor 31 is used for calculating a steering angle $θ_s$. The reaction force motor 31 is interlocked with the steering shaft 12 via the speed reduction mechanism 32. Therefore, there is a correlation between the rotation angle $θ_a$ of the reaction force motor 31 and a rotation angle of the steering shaft 12, and hence between the rotation angle $θ_a$ and the steering angle $θ_s$ representing a rotation angle of the steering wheel 11. Accordingly, the steering angle $θ_s$ can be calculated based on the rotation angle $θ_a$ of the reaction force motor 31.

The torque sensor 34 detects a steering torque $T_h$ applied to the steering shaft 12 through a rotation operation of the steering wheel 11. The torque sensor 34 is disposed at the steering wheel 11 side with respect to the speed reduction mechanism 32 on the steering shaft 12.

In the following, a steering operation unit serving as a structure for generating a steering operation force will be described. The steering system 10 includes, as a structure for generating a steering operation force as a power for turning the steered wheels 16, a steering operation motor 41, a speed reduction mechanism 42, and a rotation angle sensor 43.

The steering operation motor 41 is a source of a steering operation force. The steering operation motor 41 used herein is, for example, a three-phase brushless motor. The steering operation motor 41 (to be more precise, a rotary shaft thereof) is coupled to a pinion shaft 44 via the speed reduction mechanism 42. Pinion teeth 44a of the pinion shaft 44 mesh with rack teeth 14b of the steered shaft 14. The torque of the steering operation motor 41 is applied as a steering operation force to the steered shaft 14 via the pinion shaft 44. The steered shaft 14 moves in a vehicle width direction (lateral direction in FIG. 1) as the steering operation motor 41 rotates.

The rotation angle sensor 43 is provided on the steering operation motor 41. The rotation angle sensor 43 detects a rotation angle $θ_b$ of the steering operation motor 41. Note that the steering system 10 includes a pinion shaft 13. The pinion shaft 13 is disposed to cross the steered shaft 14. Pinion teeth 13a of the pinion shaft 13 mesh with rack teeth 14a of the steered shaft 14. The pinion shaft 13 is provided to support, together with the pinion shaft 44, the steered shaft 14 inside a housing (not illustrated). That is, the steered shaft 14 is supported by a support mechanism (not illustrated) provided in the steering system 10 so as to be movable in its axial direction, and is pressed against the pinion shafts 13 and 44. In this manner, the steered shaft 14 is supported inside the housing. However, a support mechanism that supports the steered shaft 14 without using the pinion shaft 13 may be provided.

The steering system 10 further includes a control device 50. The control device 50 controls the reaction force motor 31 and the steering operation motor 41 based on the detection results of various sensors. The sensors include a vehicle speed sensor 501, in addition to the rotation angle sensor 33, the torque sensor 34, and the rotation angle sensor 43 described above. The vehicle speed sensor 501 is mounted on the vehicle and detects a vehicle speed V representing the travel speed of the vehicle.

The control device 50 performs reaction force control to generate a steering reaction force corresponding to a steering torque $T_h$ by controlling driving of the reaction force motor 31. The control device 50 calculates a target steering reaction force based on the steering torque $T_h$ and the vehicle speed V, and calculates a target steering angle of the steering wheel 11 based on the calculated target steering reaction force, the steering torque $T_h$, and the vehicle speed V. The control device 50 calculates a steering angle correction amount through feedback control of the steering angle $θ_s$ that is performed to cause the actual steering angle $θ_s$ to follow the target steering angle, and calculates a steering reaction force command value, by adding the calculated steering angle correction amount to the target steering reaction force. The control device 50 supplies a current required for generating a steering reaction force corresponding to the steering reaction force command value to the reaction force motor 31.

The control device 50 performs steering operation control to turn the steered wheels 16 in accordance with the steering state by controlling driving of the steering operation motor 41. The control device 50 calculates a pinion angle $\theta_p$ representing the actual rotation angle of the pinion shaft 44, based on the rotation angle $\theta_b$ of the steering operation motor 41 detected by the rotation angle sensor 43. The pinion angle $\theta_p$ is a value reflecting the steered angle $\theta t$ of the steered wheels 16. The control device 50 calculates a target pinion angle using the target steering angle described above. The control device 50 calculates a deviation between the target pinion angle and the actual pinion angle $\theta_p$, and controls power supply to the steering operation motor 41 so as to eliminate the deviation.

Some vehicles are equipped with a driving assist system that assists in driver's driving operations for safer and better driving, or an automated driving system that provides an automated driving function such that the system replaces the human driver. This type of vehicle performs cooperative control for the control device 50 and other control devices of other onboard systems. Cooperative control is a technique in which control devices of multiple types of onboard systems cooperate to control the movement of a vehicle. The vehicle is equipped with, for example, a host control device 100 that performs overall control of the various onboard systems. The host control device 100 calculates an optimum control method based on the vehicle state of the moment, and provides control commands individually to the various onboard control devices according to the calculated control method.

The host control device 100 intervenes in steering control performed by the control device 50. The host control device 100 switches between ON (enabled) and OFF (disabled) of the driving assist control function or the automated driving control function thereof by operating a switch (not illustrated) provided on the driver's seat or any suitable location.

The host control device 100 calculates an additional angle command value as a command value S* for causing the vehicle to travel in the target lane, for example. The additional angle command value represents the target value of the steering angle required for the vehicle to travel in a lane in accordance with the travel state of the vehicle of the moment (angle to be added to the current steering angle). The control device 50 controls the reaction force motor 31 and the steering operation motor 41, using the command value S* calculated by the host control device 100.

The host control device 100 generates a flag as a distribution command $S_r$ for the control device 50. The flag is information indicating whether the driving assist control function or the automated driving control function is ON or OFF. The host control device 100 sets the value of the flag to 1 when the driving assist control function or the automated driving control function is ON, and sets the value of the flag to 0 when the driving assist control function or the automated driving control function is OFF.

Figure 2:
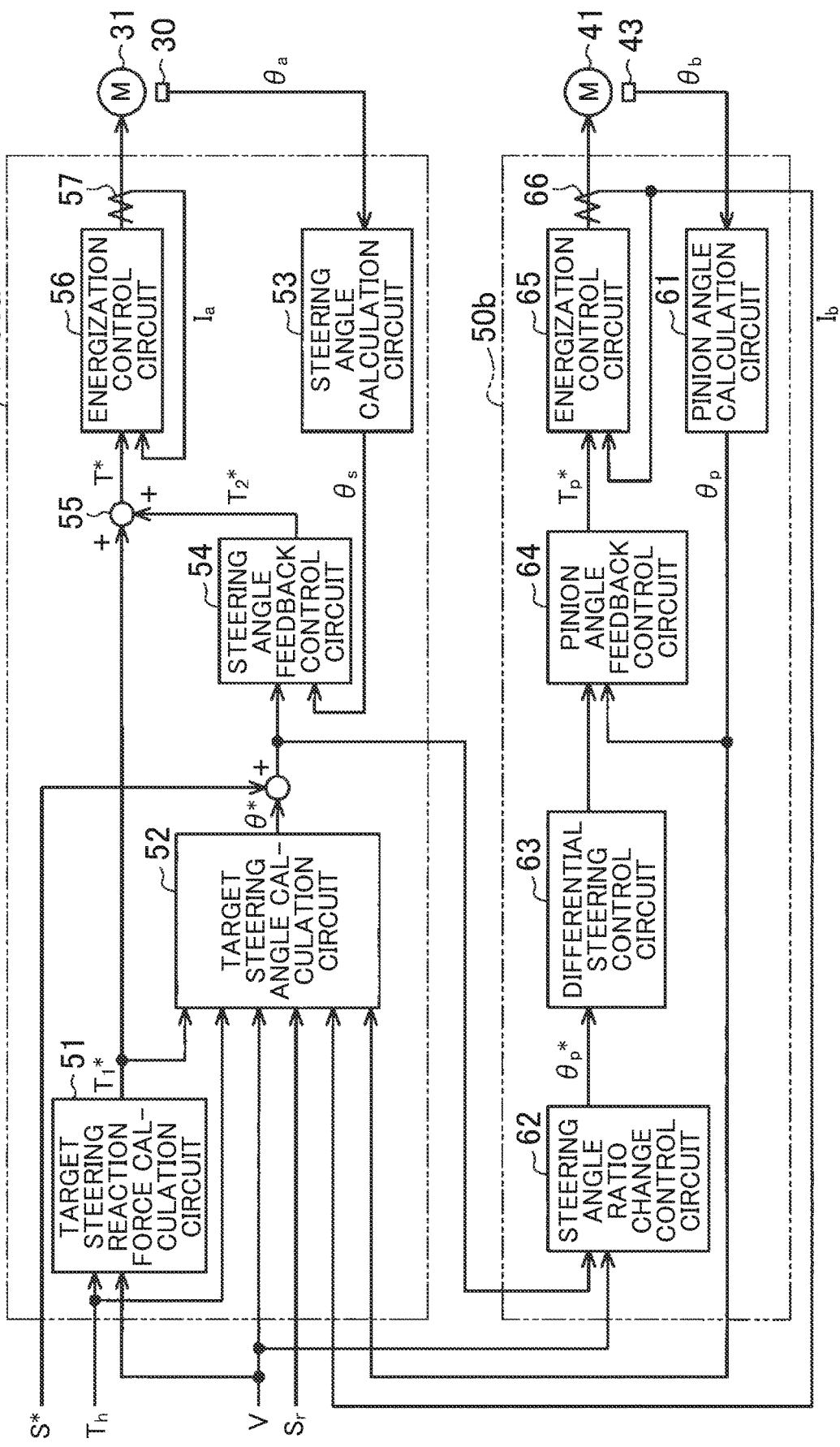
FIG. 2 is a control block diagram illustrating a control device according to the first embodiment.

In the following, the control device 50 will be described in detail. As illustrated in FIG. 2, the control device 50 includes a reaction force control circuit 50a that performs reaction force control, and a steering operation control circuit 50b that performs steering operation control.

The reaction force control circuit 50a includes a target steering reaction force calculation circuit 51, a target steering angle calculation circuit 52, a steering angle calculation circuit 53, a steering angle feedback control circuit 54, an adder 55, and an energization control circuit 56.

The target steering reaction force calculation circuit 51 calculates a target steering reaction force $T_1^*$, based on the steering torque $T_h$ and the vehicle speed V. The target steering angle calculation circuit 52 calculates a target steering angle $\theta^*$ of the steering wheel 11, based on the target steering reaction force $T_1^*$, the steering torque $T_h$, and the vehicle speed V. The target steering angle calculation circuit 52 has an ideal model that determines an ideal steering angle based on an input torque, which is the sum of the target steering reaction force $T_1^*$ and the steering torque $T_h$. The ideal model is obtained by modeling in advance, from experiments or other sources, a steering angle that corresponds to an ideal steered angle corresponding to the input torque in a steering system in which a steering wheel 11 and steered wheels 16 are mechanically coupled. The target steering angle calculation circuit 52 calculates the input torque by adding the target steering reaction force $T_1^*$ and the steering torque $T_h$, and calculates the target steering angle $\theta^*$ from the input torque based on the ideal model.

The steering angle calculation circuit 53 calculates the actual steering angle $\theta_s$ of the steering wheel 11 based on the rotation angle $\theta_a$ of the reaction force motor 31 detected by the rotation angle sensor 33. The steering angle feedback control circuit 54 calculates a steering angle correction amount $T_2^*$ through feedback control of the steering angle $\theta_s$ that is performed to cause the actual steering angle $\theta_s$ to follow the target steering angle $\theta^*$. The adder 55 calculates a steering reaction force command value T* by adding the steering angle correction amount $T_2^*$ to the target steering reaction force $T_1^*$.

The energization control circuit 56 supplies electric power corresponding to the steering reaction force command value T* to the reaction force motor 31. Specifically, the energization control circuit 56 calculates a current command value for the reaction force motor 31, based on the steering reaction force command value T*. Further, the energization control circuit 56 detects an actual current value $I_a$ in a power supply path to the reaction force motor 31, via a current sensor 57 provided in the power supply path. The current value $I_a$ is the actual value of a current supplied to the reaction force motor 31. Then, the energization control circuit 56 calculates a deviation between the current command value and the actual current value $I_a$, and controls power supply to the reaction force motor 31 so as to eliminate the deviation (feedback control of the current $I_a$). In this manner, the reaction force motor 31 generates a torque corresponding to the steering reaction force command value T*. It is therefore possible to provide an appropriate response corresponding to the road surface reaction force to the driver.

Note that in the case where the additional angle command value is calculated as the command value S* through execution of the driving assist control or the automated driving control by the host control device 100, the command value S* is added to the target steering angle $\theta^*$ calculated by the target steering angle calculation circuit 52.

As illustrated in FIG. 2, the steering operation control circuit 50b includes a pinion angle calculation circuit 61, a steering angle ratio change control circuit 62, a differential steering control circuit 63, a pinion angle feedback control circuit 64, and an energization control circuit 65.

The pinion angle calculation circuit 61 calculates a pinion angle $\theta_p$ representing the actual rotation angle of the pinion shaft 13, based on the rotation angle $\theta_b$ of the steering operation motor 41 detected by the rotation angle sensor 43.

As described above, the steering operation motor 41 is interlocked with the pinion shaft 44 via the speed reduction mechanism 42. Therefore, there is a correlation between the rotation angle $\theta_b$ of the steering operation motor 41 and the pinion angle $\theta_p$. By using this correlation, the pinion angle $\theta_p$ can be calculated from the rotation angle $\theta_b$ of the steering operation motor 41. Further, as also described above, the pinion shaft 44 meshes with the steered shaft 14. Therefore, there is also a correlation between the pinion angle $\theta_p$ and the amount of movement of the steered shaft 14. That is, the pinion angle $\theta_p$ is a value reflecting the steered angle $\theta t$ of the steered wheels 16.

The steering angle ratio change control circuit 62 sets a steering angle ratio indicating the ratio of the steered angle $\theta t$ to the steering angle $\theta_s$ in accordance with the travel state of the vehicle (for example, vehicle speed V), and calculates a target pinion angle in accordance with the set steering angle ratio. The steering angle ratio change control circuit 62 calculates a target pinion angle $\theta_p{}^*$ such that the steered angle $\theta t$ with respect to the steering angle $\theta_s$ increases as the vehicle speed V decreases, and the steered angle $\theta t$ with respect to the steering angle $\theta_s$ decreases as the vehicle speed V increases. In order to achieve the steering angle ratio that is set in accordance with the travel state of the vehicle, the steering angle ratio change control circuit 62 calculates a correction angle for the target steering angle $\theta^*$, and calculates the target pinion angle $\theta_p{}^*$ in accordance with the steering angle ratio, by adding the calculated correction angle to the target steering angle $\theta^*$.

The differential steering control circuit 63 calculates a change rate (steered speed) of the target pinion angle $\theta_p{}^*$, by differentiating the target pinion angle $\theta_p{}^*$. Further, the differential steering control circuit 63 calculates a correction angle for the target pinion angle $\theta_p{}^*$, by multiplying the change rate of the target pinion angle $\theta_p{}^*$ by a gain. The differential steering control circuit 63 calculates a final target pinion angle $\theta_p{}^*$, by adding the correction angle to the target pinion angle $\theta_p{}^*$. When the phase of the target pinion angle $\theta_p{}^*$ calculated by the steering angle ratio change control circuit 62 is advanced, delay in the steering operation is reduced. That is, the steering operation responsiveness is secured in accordance with the steered speed.

The pinion angle feedback control circuit 64 calculates a pinion angle command value $T_p{}^*$ through feedback control (PID control) of the pinion angle $\theta_p$ that is performed to cause the actual pinion angle $\theta_p$ to follow the final target pinion angle $\theta_p{}^*$ calculated by the differential steering control circuit 63.

The energization control circuit 65 supplies electric power corresponding to the pinion angle command value $T_p{}^*$ to the steering operation motor 41. Specifically, the energization control circuit 65 calculates a current command value for the steering operation motor 41 based on the pinion angle command value $T_p{}^*$. Further, the energization control circuit 65 detects an actual current value $I_b$ in a power supply path to the steering operation motor 41, via a current sensor 66 provided in the power supply path. The current value $I_b$ is the actual value of a current supplied to the steering operation motor 41. Then, the energization control circuit 65 calculates a deviation between the current command value and the actual current value $I_b$, and controls power supply to the steering operation motor 41 so as to eliminate the deviation (feedback control of the current value $I_b$). Thus, the steering operation motor 41 rotates by an angle corresponding to the pinion angle command value $T_p{}^*$.

In the following, the target steering angle calculation circuit 52 will be described in detail. As described above, the target steering angle calculation circuit 52 calculates the target steering angle $\theta^*$ from the input torque, which is the sum of the target steering reaction force $T_1{}^*$ and the steering torque $T_h$, based on the ideal model. The ideal model is obtained using the fact that an input torque $T_{in}{}^*$ representing a torque applied to the steering shaft 12 is expressed by the following expression (A):

$$T_{in}{}^* = J\theta^{*\prime\prime} + C\theta^{*\prime} + K\theta^* \quad (A)$$

where J is an inertia moment of the steering wheel 11 and the steering shaft 12; C is a viscosity coefficient (friction coefficient) corresponding to a friction of the steered shaft 14 against the housing; K is a spring coefficient when each of the steering wheel 11 and the steering shaft 12 is regarded as a spring.

As is clear from expression (A), the input torque $T_{in}{}^*$ is calculated by adding a value obtained by multiplying a second order time differential value $\theta^{*\prime\prime}$ of the target steering angle $\theta^*$ by the inertia moment J, a value obtained by multiplying a first order differential value $\theta^{*\prime}$ of the target steering angle $\theta^*$ by the viscosity coefficient C, and a value obtained by multiplying the target steering angle $\theta^*$ by the spring coefficient K. The target steering angle calculation circuit 52 calculates the target steering angle $\theta^*$ according to the ideal model based on expression (A).

Figure 3:
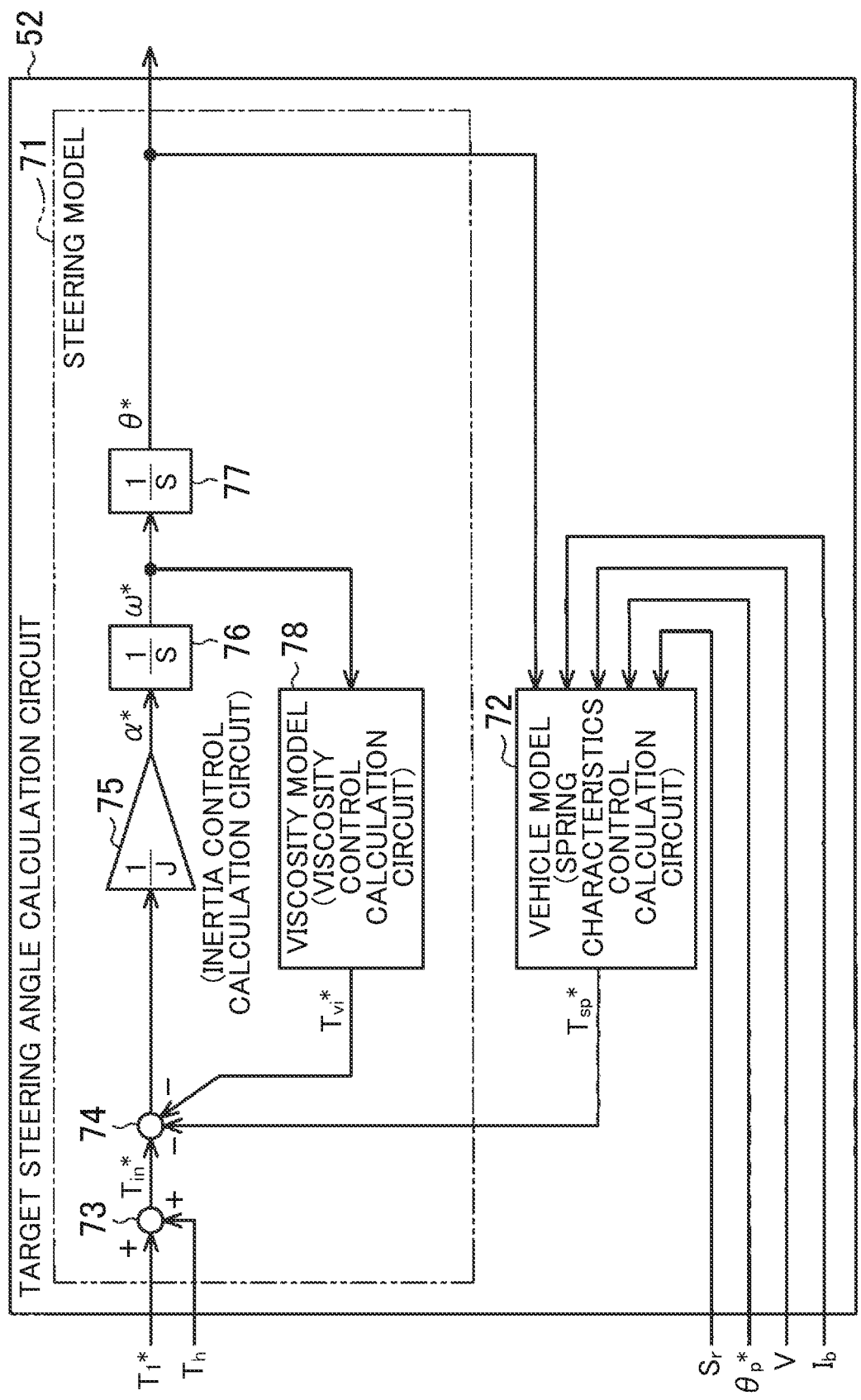
FIG. 3 is a control block diagram illustrating a target steering angle calculation circuit according to the first embodiment.

As illustrated in FIG. 3, the ideal model based on expression (A) includes a steering model 71 and a vehicle model 72. The steering model 71 is tuned based on the characteristics of the components of the steering system 10, such as the steering shaft 12 and the reaction force motor 31. The steering model 71 includes an adder 73, a subtractor 74, an inertia model 75, a first integrator 76, a second integrator 77, and a viscosity model 78.

The adder 73 calculates the input torque $T_{in}{}^*$ by adding the target steering reaction force $T_1{}^*$ and the steering torque $T_h$. The subtractor 74 subtracts a viscosity component $T_{vi}{}^*$ and a spring component $T_{sp}{}^*$ (described below) respectively from the input torque $T_{in}{}^*$ calculated by the adder 73, and thereby calculates a final input torque $T_{in}{}^*$.

The inertia model 75 serves as an inertia control calculation circuit corresponding to an inertia term in expression (A). The inertia model 75 calculates a steering angular acceleration $\alpha^*$, by multiplying the final input torque $T_{in}{}^*$ calculated by the subtractor 74 by a reciprocal of the inertia moment J.

The first integrator 76 calculates a steering angular velocity $\omega^*$ by integrating the steering angular acceleration $\alpha^*$ calculated by the inertia model 75. The second integrator 77 calculates the target steering angle $\theta^*$ by further integrating the steering angular acceleration $\omega^*$ calculated by the first integrator 76. The target steering angle $\theta^*$ is an ideal rotation angle of the steering wheel 11 (steering shaft 12) based on the steering model 71.

The viscosity model 78 serves as a viscosity control calculation circuit corresponding to a viscosity term in expression (A). The viscosity model 78 calculates the viscosity component $T_{vi}{}^*$ of the input torque $T_{in}{}^*$, by multiplying the steering angular velocity $\omega^*$ calculated by the first integrator 76 by the viscosity coefficient C.

The vehicle model 72 is tuned based on the characteristics of the vehicle equipped with the steering system 10. The characteristics of the vehicle that affect the steering characteristics are determined by, for example, the design of the suspension and the wheel alignment, and the gripping force (frictional force) of the steered wheels 16. The vehicle model 72 serves as a spring characteristics control calculation circuit corresponding to a spring term in expression (A).

The vehicle model 72 calculates the spring component $T_{sp}^*$ (torque) of the input torque $T_{in}^*$, by multiplying the target steering angle $\theta^*$ calculated by the second integrator 77 by the spring coefficient K.

According to the target steering angle calculation circuit 52 configured as described above, by adjusting the inertia moment J and the viscosity coefficient C of the steering model 71 and the spring coefficient K of the vehicle model 72, it is possible to directly tune the relationship between the input torque $T_{in}^*$ and the target steering angle $\theta^*$ and hence to achieve the desired steering characteristics.

The target pinion angle $\theta_p^*$ is calculated using the target steering angle $\theta^*$ calculated from the input torque $T_{in}^*$ based on the steering model 71 and the vehicle model 72. Then, feedback control is performed such that the actual pinion angle $\theta_p$ coincides with the target pinion angle $\theta_p^*$. As described above, there is a correlation between the pinion angle $\theta_p$ and the steered angle $\theta_t$ of the steered wheels 16. Thus, a steered motion of the steered wheels 16 based on the input torque $T_{in}^*$ is also determined by the steering model 71 and the vehicle model 72. That is, the vehicle steering feel is determined by the steering model 71 and the vehicle model 72. Accordingly, it is possible to achieve the desired steering feel by adjusting the steering model 71 and the vehicle model 72.

However, the force (torque) applied in the direction opposite to the direction of steering by the driver, that is, the steering reaction force (the response felt through steering) corresponds only to the target steering angle $\theta^*$. That is, the steering reaction force does not vary in accordance with the vehicle behavior or the road conditions (such as slipperiness of the road). Therefore, the driver hardly recognizes the road conditions or the vehicle behavior through the steering reaction force. In the present embodiment, in order to solve these issues, the vehicle model 72 is configured as described below.

Figure 4:
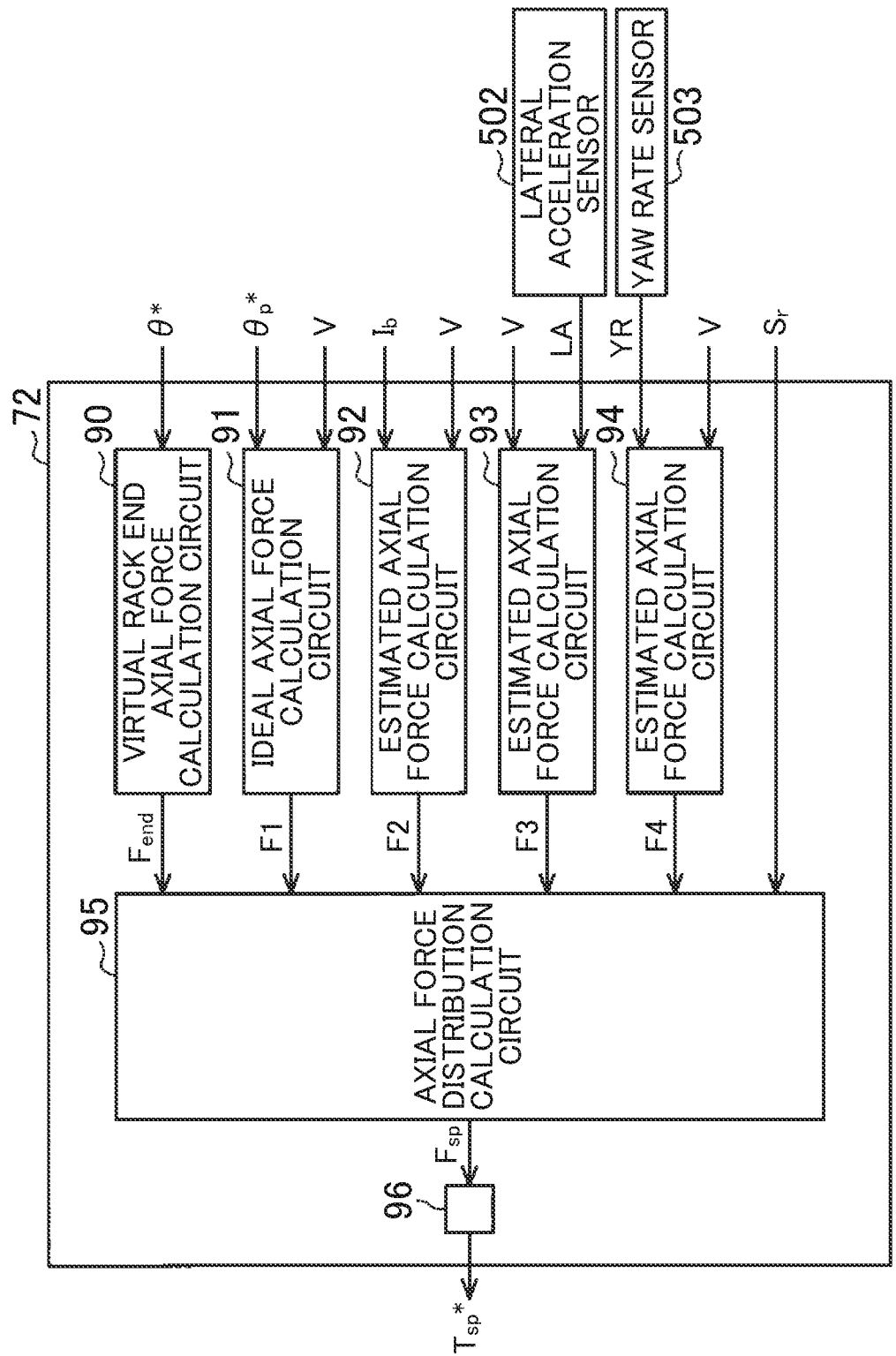
FIG. 4 is a control block diagram illustrating a vehicle model according to the first embodiment.

As illustrated in FIG. 4, the vehicle model 72 includes a virtual rack end axial force calculation circuit 90, an ideal axial force calculation circuit 91, an estimated axial force calculation circuit 92, an estimated axial force calculation circuit 93, an estimated axial force calculation circuit 94, an axial force distribution calculation circuit 95, and a conversion circuit 96.

The virtual rack end axial force calculation circuit 90 calculates a virtual rack end axial force $F_{end}$ for virtually limiting the operation range of the steering wheel 11, based on the target steering angle $\theta^*$. The virtual rack end axial force $F_{end}$ is calculated so as to rapidly increase the torque (steering reaction force torque) in the direction opposite to the steering direction to be generated by the reaction force motor 31. The virtual rack end axial force calculation circuit 90 calculates the virtual rack end axial force $F_{end}$, using a virtual rack end map stored in a storage device (not illustrated) of the control device 50. The virtual rack end axial force $F_{end}$ is generated after the target steering angle $\theta^*$ reaches an angle threshold, and rapidly increases as the target steering angle $\theta^*$ increases.

The ideal axial force calculation circuit 91 calculates an ideal axial force F1 representing an ideal value of the axial force applied to the steered shaft 14 via the steered wheels 16, based on the target pinion angle $\theta_p^*$. The ideal axial force calculation circuit 91 calculates an ideal axial force F1, using an ideal axial force map stored in a storage device (not illustrated) of the control device 50. The ideal axial force F1 is set to be a greater absolute value as the absolute value of the target pinion angle $\theta_p^*$ (or a target steered angle obtained by multiplying the target pinion angle $\theta_p^*$ by a predetermined conversion coefficient) increases or the vehicle speed V decreases. Note that the vehicle speed V does not have to be taken into account.

The estimated axial force calculation circuit 92 calculates an estimated axial force F2 (road surface reaction force) applied to the steered shaft 14, based on the current value $I_b$ of the steering operation motor 41. Here, when a disturbance due to the road conditions (road surface frictional resistance) affects the steered wheels 16, the actual pinion angle $\theta_p$ deviates from the target pinion angle $\theta_p^*$, so that the current value $I_b$ of the steering operation motor 41 varies. That is, the current value $I_b$ of the steering operation motor 41 reflects the actual road surface reaction force applied to the steered wheels 16. Therefore, the axial force that reflects the influence of the road conditions can be calculated based on the current value $I_b$ of the steering operation motor 41. The estimated axial force F2 is calculated by multiplying the current value $I_b$ of the steering operation motor 41 by a gain that is a coefficient corresponding to the vehicle speed V.

The estimated axial force calculation circuit 93 calculates an estimated axial force F3 applied to the steered shaft 14, based on a lateral acceleration LA detected by a lateral acceleration sensor 502 mounted on the vehicle. The estimated axial force F3 is calculated by multiplying the lateral acceleration LA by a gain that is a coefficient corresponding to the vehicle speed V. The lateral acceleration LA reflects the road conditions such as the road surface frictional resistance. Therefore, the estimated axial force F3 calculated based on the lateral acceleration LA reflects the actual road conditions.

The estimated axial force calculation circuit 94 calculates an estimated axial force F4 applied to the steered shaft 14, based on a yaw rate YR detected by a yaw rate sensor 503 mounted on the vehicle. The estimated axial force F4 is calculated by multiplying a yaw rate differential value, which is obtained by differentiating the yaw rate YR, by a vehicle speed gain that is a coefficient corresponding to the vehicle speed V. The vehicle speed gain is set to a greater value as the vehicle speed V increases. The yaw rate YR reflects the road conditions such as the road surface frictional resistance. Therefore, the estimated axial force F4 calculated based on the yaw rate YR reflects the actual road conditions.

The axial force distribution calculation circuit 95 calculates a final axial force $F_{sp}$ to be used for calculation of the spring component $T_{sp}^*$ of the input torque $T_{in}^*$, by summing values obtained by multiplying the virtual rack end axial force $F_{end}$, the ideal axial force F1, the estimated axial force F2, the estimated axial force F3, and the estimated axial force F4 by individually set distribution rates (gains). The distribution rates are set in accordance with the various state quantities reflecting the vehicle behavior, the road conditions, or the steering state.

The conversion circuit 96 calculates (converts) the spring component $T_{sp}^*$ of the input torque $T_{in}^*$ based on the final axial force $F_{sp}$ calculated by the axial force distribution calculation circuit 95. By reflecting the spring component $T_{sp}^*$ based on the final axial force $F_{sp}$ in the input torque $T_{in}^*$, it is possible to apply the steering reaction force corresponding to the vehicle behavior or the road conditions to the steering wheel 11.

The following concerns arise when the vehicle is equipped with a driving assist system or an automated driving system. For example, the steering reaction force generated by the reaction force motor 31 affects the behavior of the steering wheel 11. Therefore, the demand with respect to reaction force control performed by the control device 50 when the driver manually drives the vehicle is often different from that when driving assist or automated driving is performed.

For example, in the case where the driver manually drives the vehicle, it is preferable that the vehicle behavior or the road conditions are reflected in the steering reaction force to be generated by the reaction force motor 31. This is because the driver can steer the vehicle more quickly and accurately when the driver recognizes the vehicle behavior or the road conditions through the steering reaction force. Meanwhile, in the case where driving assist or automated driving is performed, that is, in the case where the steering wheel 11 is operated by the host control device 100 of the driving assist system or the automated driving system instead of the driver, the vehicle behavior or the road conditions do not always have to be accurately reflected in the steering reaction force to be generated by the reaction force motor 31. Further, in the case where driving assist or automated driving is performed, when the vehicle is traveling on a bumpy road, for example, if the road conditions are reflected in the steering reaction force, the steering wheel 11 might be rotated. Therefore, some product specifications require minimizing unnecessary motion of the steering wheel 11 when driving assist or automated driving is performed.

Figure 5:
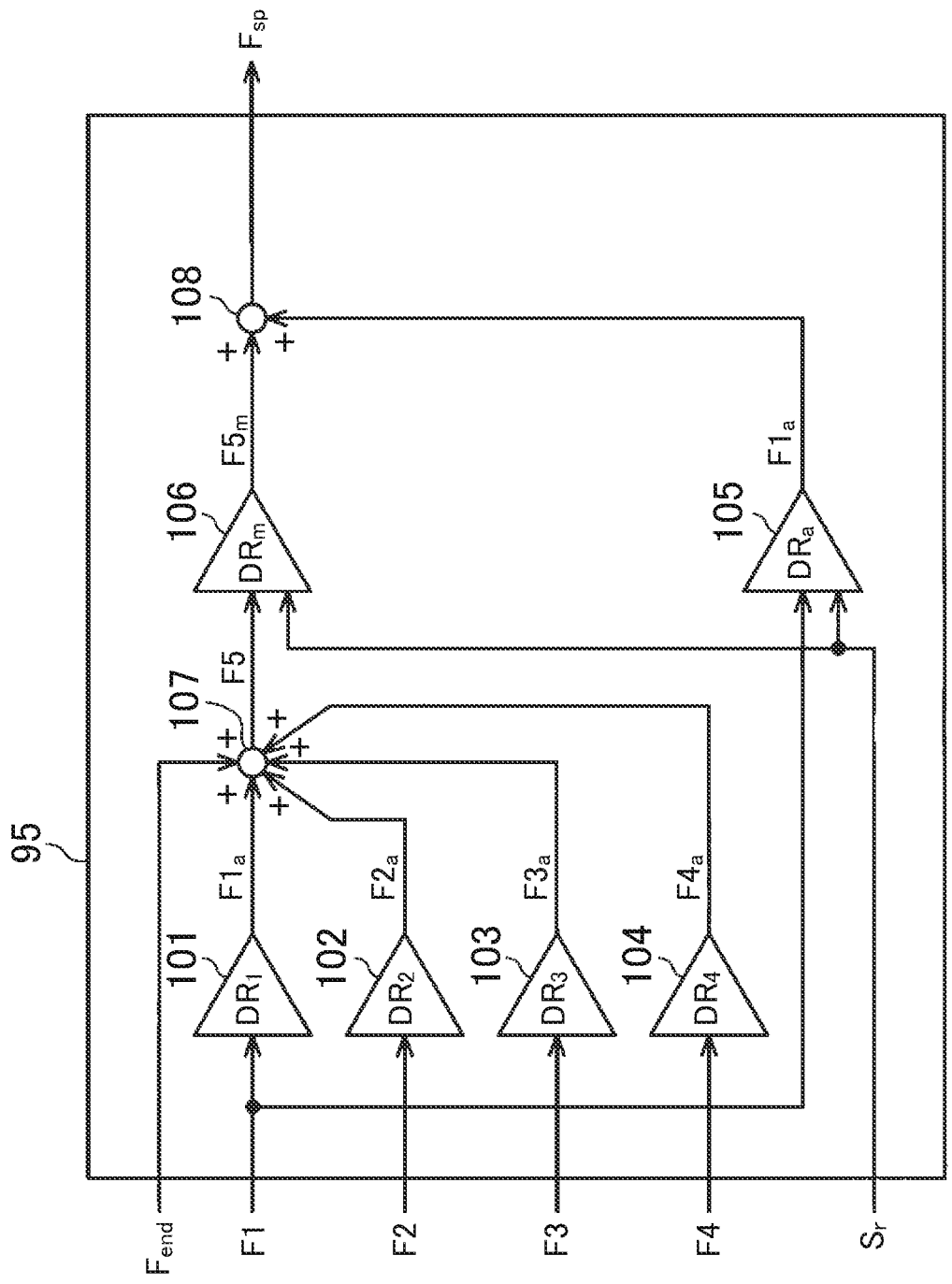
FIG. 5 is a control block diagram illustrating an axial force distribution calculation circuit according to first and second embodiments.

In view of the above, in the present embodiment, the axial force distribution calculation circuit 95 has the following configuration. As illustrated in FIG. 5, the axial force distribution calculation circuit 95 includes six calculation circuits 101, 102, 103, 104, 105, and 106, and two adders 107 and 108.

The calculation circuit 101 calculates an ideal axial force $F1_a$ corresponding to a distribution rate $DR_1$, by multiplying the ideal axial force F1 calculated by the ideal axial force calculation circuit 91 by the distribution rate $DR_1$. The calculation circuit 102 calculates an estimated axial force $F2_a$ corresponding to a distribution rate $DR_2$, by multiplying the estimated axial force F2 calculated by the estimated axial force calculation circuit 92 by the distribution rate $DR_2$. The calculation circuit 103 calculates an estimated axial force $F3_a$ corresponding to a distribution rate $DR_3$, by multiplying the estimated axial force F3 calculated by the estimated axial force calculation circuit 93 by the distribution rate $DR_3$. The calculation circuit 104 calculates an estimated axial force $F4_a$ corresponding to a distribution rate $DR_4$, by multiplying the estimated axial force F4 calculated by the estimated axial force calculation circuit 94 by the distribution rate $DR_4$. The distribution rates $DR_1$, $DR_2$, $DR_3$, and $DR_4$ are changed in accordance with the state quantities reflecting the vehicle behavior, the road conditions, or the steering state.

The adder 107 calculates a mixed axial force F5, by summing the ideal axial force $F1_a$ calculated by the calculation circuit 101, and the estimated axial forces $F2_a$, $F3_a$, and $F4_a$ calculated by the calculation circuits 102 to 104.

The calculation circuit 105 acquires the ideal axial force F1 calculated by the calculation circuit 101, and the distribution command $S_r$ calculated by the host control device 100. The calculation circuit 105 calculates a distribution rate $DR_a$ of the ideal axial force F1 by assigning the value of the flag serving as the distribution command $S_r$ in the following expression (B):

$$DR_a = S_r \quad (B)$$

Accordingly, when the value of the flag serving as the distribution command $S_r$ is 1, the value of the distribution rate $DR_a$ is 1. When the value of the flag serving as the distribution command $S_r$ is 0, the value of the distribution rate $DR_a$ is 0.

The calculation circuit 105 calculates an ideal axial force $F1_a$ corresponding to the distribution rate $DR_a$, by multiplying the ideal axial force F1 by the distribution rate $DR_a$, according to the following expression (C):

$$F1_a = DR_a \cdot F1 \quad (C)$$

Accordingly, when the value of the distribution rate $DR_a$ is 1 (100%), the ideal axial force F1 calculated by the calculation circuit 101 directly represents the ideal axial force $F1_a$. When the value of the distribution rate $DR_a$ is 0 (0%), the value of the ideal axial force $F1_a$ is 0.

The calculation circuit 106 acquires the mixed axial force F5 calculated by the adder 107 and the distribution command $S_r$ calculated by the host control device 100. The calculation circuit 106 calculates a distribution rate $DR_m$ of the mixed axial force F5 by assigning the value of the flag serving as the distribution command $S_r$ in the following expression (D).

$$DR_m = 1 - S_r \quad (D)$$

Accordingly, when the value of the flag serving as the distribution command $S_r$ is 1, the value of the distribution rate $DR_m$ is 0. When the value of the flag as the distribution command $S_r$ is 0, the value of the distribution rate $DR_m$ is 1.

The calculation circuit 106 calculates a mixed axial force $F5_m$ corresponding to the distribution rate $DR_m$, by multiplying the mixed axial force F5 by the distribution rate $DR_m$, according to the following expression (E):

$$F5_m = DR_m \cdot S_r \quad (E)$$

Accordingly, when the value of the flag serving as the distribution command $S_r$ is 1 (100%), the mixed axial force F5 calculated by the adder 107 directly represents the mixed axial force $F5_m$ as the calculation result of expression (E). When the value of the flag serving as the distribution command $S_r$ is 0 (0%), the value of the mixed axial force $F5_m$ is 0.

The adder 108 calculates the final axial force $F_{sp}$ to be used for calculation of the spring component $T_{sp}*$, by adding the ideal axial force $F1_a$ calculated by the calculation circuit 105 and the mixed axial force $F5_m$ calculated by the calculation circuit 106.

According to the first embodiment, the following effects can be obtained.

(1) The demand with respect to the steering reaction force (driving force) to be generated by the reaction force motor 31 when the host control device 100 intervenes in steering control (when the command value S* is calculated) is often different from that when the host control device 100 does not intervene in steering control (when the command value S* is not calculated). For example, when the host control device 100 intervenes in steering control, it is often desired not to reflect the vehicle behavior or the road conditions in the steering reaction force to be generated by the reaction force motor 31. This is because, in the case where the host control device 100 operates the steering wheel 11, the vehicle behavior or the road conditions do not always have to be reflected in the steering reaction force to be generated by the reaction force motor 31.

In view of this, according to the control device 50 of the steering system 10, when the host control device 100 intervenes in steering control, the axial force to be reflected in the input torque $T_{in}*$ and hence in the steering reaction force command value T* is switched from the mixed axial force F5 containing the estimated axial forces $F2_a$, $F3_a$, and $F4_a$ to the ideal axial force F1, based on the distribution command $S_r$. Since the vehicle behavior or the road conditions are not reflected in the ideal axial force F1, the vehicle behavior or the road conditions are not reflected in the input torque $T_{in}*$ and hence in the steering reaction force generated by the reaction force motor 31. Therefore, for example, even when the vehicle is travelling on a bumpy road, useless rotation of the steering wheel 11 due to the road conditions is reduced. Accordingly, it is possible to respond to intervention in steering by the host control device 100.

Hereinafter, a steering control system according a second embodiment will be described. The configuration of the present embodiment is basically the same as that of the first embodiment illustrated in FIGS. 1 to 5.

In the present invention, the host control device 100 supplies an automated driving rate as the distribution command $S_r$ to the control device 50 instead of a flag (0 or 1). The automated driving rate is a value indicating the level of involvement of the system in driving the vehicle. As the driving assist system becomes more complex or advanced with the improvement of technology level, the level of involvement of the system in driving increases. For example, when the automated driving rate is 100%, the system completely replaces the human driver. Conversely, when the automated driving rate is 0%, the human driver performs all the tasks such as recognition of the traveling environment, determination of dangers, and vehicle driving operations (steering, acceleration, and so on). In the present embodiment, the host control device 100 sets the automated driving rate to a value ranging from 0 (0%) to 1 (100%).

In this case as well, the calculation circuit 105 of the axial force distribution calculation circuit 95 calculates a distribution rate $DR_a$ of the ideal axial force F1, and an ideal axial force $F1_a$ corresponding to the distribution rate $DR_a$, using the expressions (B) and (C). Further, the calculation circuit 106 calculates a distribution rate $DR_m$ of the mixed axial force F5, and a mixed axial force $F5_m$ corresponding to the distribution rate $DR_m$, using the expressions (D) and (E).

For example, when the value of the automated driving rate is 1 (100%), the distribution rate $DR_a$ is set to 1 based on expression (B), and the distribution rate $DR_m$ is set to 0 based on expression (D). When the value of the automated driving rate is 0.3 (30%), the distribution rate $DR_a$ is set to 0.3 based on expression (B), and the distribution rate $DR_m$ is set to 0.7 based on expression (D).

According to the second embodiment, the following effects can be obtained.

(2) When the host control device 100 intervenes in steering control, the distribution rate $DR_a$ of the ideal axial force F1 and the distribution rate $DR_m$ of the mixed axial force F5 containing the estimated axial forces $F2_a$, $F3_a$, and $F4_a$ are set based on the automated driving rate serving as the distribution command $S_r$. Therefore, the level at which the vehicle behavior or the road conditions are reflected in the input torque $T_{in}*$ and hence in the steering reaction force command value $T*$ is suitably set in accordance with the automated driving rate. Accordingly, it is possible to appropriately respond to intervention in steering control by the host control device 100.

Hereinafter, a third embodiment will be described. In the third embodiment, a steering control device is applied to an electric power steering system (hereinafter referred to as an "EPS"). Elements identical to those in the first embodiment bear the same reference numerals and are not further described.

In an EPS, the steering wheel 11 is mechanically coupled to the steered wheels 16 as illustrated in FIG. 1. That is, the steering shaft 12, the pinion shaft 13, and the steered shaft 14 serve as a power transmission path between the steering wheel 11 and the steered wheels 16. When the steered shaft 14 moves linearly with a rotation operation of the steering wheel 11, a steered angle θt of the steered wheels 16 is changed. Further, the EPS includes an assist motor that is disposed at the same position as that of one of the reaction force motor 31 and the steering operation motor 41 illustrated in FIG. 1. The assist motor generates a steering assist force (assist force).

Figure 6:
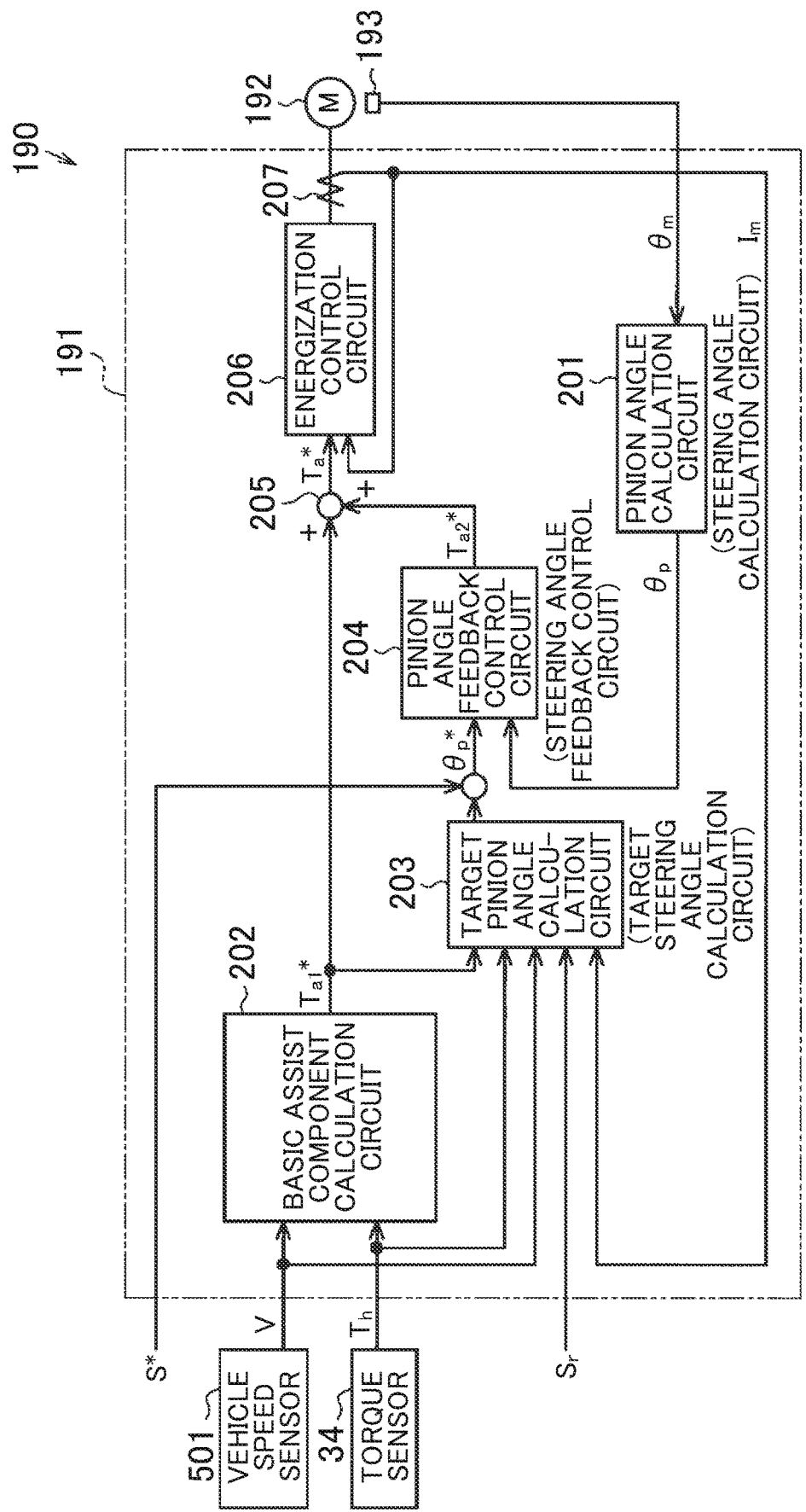
FIG. 6 is a control block diagram illustrating a steering control device according to a third embodiment applied to an electric power steering system.

As illustrated in FIG. 6, a control device 191 of an EPS 190 performs assist control that causes an assist motor 192 to generate a steering assist force corresponding to the steering torque $T_h$ by controlling energization of the assist motor 192. The control device 191 controls power supply to the assist motor 192, based on the steering torque $T_h$ detected by the torque sensor 34, the vehicle speed V detected by the vehicle speed sensor 501, and the rotation angle $θ_m$ detected by a rotation angle sensor 193 provided on the assist motor 192.

The control device 191 includes a pinion angle calculation circuit 201, a basic assist component calculation circuit 202, a target pinion angle calculation circuit 203, a pinion angle feedback control circuit 204, an adder 205, and an energization control circuit 206.

The pinion angle calculation circuit 201 acquires the rotation angle $θ_m$ of the assist motor 192, and calculates a pinion angle $θ_p$ representing a rotation angle of the pinion shaft 13 based on the acquired rotation angle $θ_m$.

The basic assist component calculation circuit 202 calculates a basic assist component $T_{a1}*$, based on the steering torque $T_h$ and the vehicle speed V. The basic assist component calculation circuit 202 calculates the basic assist component $T_{a1}*$, using a three-dimensional map defining the relationship between the steering torque $T_h$ and the basic assist component $T_{a1}*$ in accordance with the vehicle speed V. The basic assist component calculation circuit 202 increases the absolute value of the basic assist component $T_{a1}*$ as the absolute value of the steering torque $T_h$ increases, or as the vehicle speed V decreases.

The target pinion angle calculation circuit 203 acquires the basic assist component $T_{a1}*$ calculated by the basic assist component calculation circuit 202, and the steering torque $T_h$. The target pinion angle calculation circuit 203 has an ideal model that determines an ideal pinion angle based on an input torque, which is the sum of the basic assist component $T_{a1}*$ and the steering torque $T_h$. The ideal model is obtained by modeling in advance, from experiments or other sources, a pinion angle that corresponds to an ideal steered angle corresponding to the input torque. The target pinion angle calculation circuit 203 calculates the input torque by adding the basic assist component $T_{a1}*$ and the steering torque $T_h$, and calculates a target pinion angle $θ_p$ from the calculated input torque based on the ideal model.

The pinion angle feedback control circuit 204 acquires the target pinion angle $θ_p*$ calculated by the target pinion angle calculation circuit 203, and the actual pinion angle $θ_p$ calculated by the pinion angle calculation circuit 201. The pinion angle feedback control circuit 204 performs proportional-integral-derivative control (PID) control as feedback control of the pinion angle such that the actual pinion angle $θ_p$ follows the target pinion angle $θ_p*$. That is, the pinion angle feedback control circuit 204 calculates a deviation between the target pinion angle $θ_p*$ and the actual pinion angle $θ_p$, and calculates a correction component $T_{a2}*$ for the basic assist component $T_{a1}*$ so as to eliminate the deviation.

The adder 205 calculates an assist command value $T_a*$ by adding the correction component $T_{a2}*$ to the basic assist component $T_{a1}*$. The assist command value $T_a*$ is a command value indicating a rotational force (assist torque) that needs to be generated by the assist motor 192.

The energization control circuit 206 supplies electric power corresponding to the assist command value $T_a^*$ to the assist motor 192. Specifically, the energization control circuit 206 calculates a current command value for the assist motor 192 based on the assist command value $T_a^*$. Further, the energization control circuit 206 acquires a current value $I_m$ detected by a current sensor 207. The current value $I_m$ is the actual value of a current supplied to the assist motor 192. Then, the energization control circuit 206 calculates a deviation between the current command value and the actual current value $I_m$, and controls power supply to the assist motor 192 so as to eliminate the deviation. In this manner, the assist motor 192 generates a torque corresponding to the assist command value $T_a^*$. As a result, steering assist is performed in accordance with the steering state.

According to the EPS 190, the target pinion angle $\theta_p^*$ is set from the input torque (the sum of the basic assist component $T_{a1}^*$ and the steering torque $T_h$) based on the ideal model, and feedback control is performed such that the actual pinion angle $\theta_p$ coincides with the target pinion angle $\theta_p^*$. Here, there is a correlation between the pinion angle $\theta_p$ and the steered angle $\theta_t$ of the steered wheels 16. Thus, a steered motion of the steered wheels 16 based on the input torque is also determined by the ideal model. That is, the vehicle steering feel is determined by the ideal model. Accordingly, it is possible to achieve the desired steering feel by adjusting the ideal model.

The actual steering angle $\theta t$ is maintained at the steered angle $\theta t$ corresponding to the target pinion angle $\theta_p^*$. Therefore, it is also possible to reduce reverse input vibration due to a disturbance such as the road conditions or a braking operation. That is, even when vibration is transmitted to the steering mechanism such as the steering shaft 12 via the steered wheels 16, the correction component $T_{a2}^*$ is adjusted such that the pinion angle $\theta_p$ coincides with the target pinion angle $\theta_p^*$. Thus, the actual steering angle $\theta t$ is maintained at the steered angle $\theta t$ corresponding to the target pinion angle $\theta_p^*$ determined by the ideal model. As a result, steering assist is performed in such a direction that the reverse input vibration is cancelled out, which reduces transmission of the reverse input vibration to the steering wheel 11.

However, the force (torque) applied in the direction opposite to the direction of steering by the driver, that is, the steering reaction force (the response felt through steering) corresponds only to the target pinion angle $\theta_p^*$. That is, for example, the steering reaction force does not vary in accordance with the vehicle behavior or the road conditions. Therefore, the driver hardly recognizes the road conditions through the response.

In view of the above, in the present embodiment, the target pinion angle calculation circuit 203 has a calculation function similar to that of the target steering angle calculation circuit 52 of the first embodiment. The target pinion angle calculation circuit 203 has a configuration similar to that of the target steering angle calculation circuit 52 illustrated in FIG. 3. However, the above-described target steering angle calculation circuit 52 acquires the target steering reaction force $T_1^*$, whereas the target pinion angle calculation circuit 203 acquires the basic assist component $T_{a1}^*$. The target pinion angle calculation circuit 203 acquires the steering torque $T_h$ and the vehicle speed V, in the same manner as the above-described target steering angle calculation circuit 52. The target steering angle calculation circuit 52 calculates the target steering angle $\theta^*$, whereas the target pinion angle calculation circuit 203 calculates the target pinion angle $\theta_p^*$. Although one or more of the signals to be acquired and the signal to be generated differ between the target pinion angle calculation circuit 203 and the target steering angle calculation circuit 52, the internal calculation operation performed by the target pinion angle calculation circuit 203 is the same as that of the target steering angle calculation circuit 52.

According to the target pinion angle calculation circuit 203 with the configuration described above, since the final axial force $F_{sp}$ (see FIG. 4) calculated by the axial force distribution calculation circuit 95 is reflected in the input torque $T_{in}^*$, it is possible to obtain the target pinion angle $\theta_p^*$ and hence the assist command value $T_a^*$ reflecting the vehicle behavior or the road conditions. Therefore, a more appropriate amount of assist force corresponding to the vehicle behavior or the road conditions is applied to the steering wheel 11. Therefore, the driver can appropriately recognize the vehicle behavior or the road conditions through the steering reaction force felt as a response from the steering wheel 11.

In the case where the vehicle is equipped with a driving assist system or an automated driving system, the same concerns as those of the first embodiment arise. That is, the demand with respect to assist control performed by the control device 191 when the driver manually drives the vehicle is often different from that when driving assist or automated driving is performed.

In view of this, the target pinion angle calculation circuit 203 has the same configuration as the vehicle model 72 illustrated in FIG. 4 and hence the axial force distribution calculation circuit 95 illustrated in FIG. 5. Therefore, according to the third embodiment, the same effects as those described in (1) and (2) of the first embodiment can be obtained.

That is, when the host control device 100 intervenes in steering control, the axial force to be reflected in the input torque $T_{in}^*$ and hence in the steering reaction force command value $T^*$ is switched from the mixed axial force $F5$ containing the estimated axial forces $F2_a$, $F3_a$, and $F4_a$ to the ideal axial force $F1$, based on the distribution command $S_r$ (see FIG. 5). Therefore, the vehicle behavior or the road conditions are not reflected in the input torque $T_{in}^*$ and hence in the steering assist force to be generated by the assist motor 192. Further, it is possible to reduce useless rotation of the steering wheel 11 due to the road conditions. Therefore, even in the case where the vehicle is equipped with a driving assist system or an automated driving system, it is possible to appropriately respond to intervention in steering control by the host control device 100. Further, the second embodiment may be applied to the present embodiment. In this case, the same effects as those of the second embodiment can be obtained.

The above embodiments may be modified as described below. The target steering reaction force calculation circuit 51 of the first and second embodiments and the basic assist component calculation circuit 202 of the third embodiment do not have to use the vehicle speed V.

In the first to third embodiments, the vehicle model 72 (see FIG. 4) has only to include at least one of the three estimated axial force calculation circuits 92, 93, and 94. By reflecting the estimated axial force calculated by one of the estimated axial force calculation circuits 92, 93, and 94 in the input torque $T_{in}^*$, it is possible to reflect the vehicle behavior or the road conditions in the steering reaction force.

In the first to third embodiments, at least one of the following axial forces (a1) to (a6) may be used as the estimated axial force to be reflected in the input torque $T_{in}^*$, in addition to or instead of the estimated axial forces F2 to F4.

(a1) estimated axial force calculated based on the lateral acceleration LA and the yaw rate differential value (a2) estimated axial force calculated by summing values obtained by multiplying the estimated axial force F2 and the estimated axial force F3 by predetermined distribution rates that are individually set (a3) estimated axial force calculated by summing values obtained by multiplying the estimated axial force F2 and the estimated axial force F4 by predetermined distribution rates that are individually set (a4) estimated axial force calculated by summing values obtained by multiplying the estimated axial force F2, the estimated axial force F3, and the estimated axial force F4 by predetermined distribution rates that are individually set (a5) estimated axial force calculated by summing values obtained by multiplying the estimated axial force F2 and the estimated axial force of (a1) described above by predetermined distribution rates that are individually set In the first to third embodiments, the control devices 50 and 191 may have a low-pass filter that performs gradual change processing for gradually changing the distribution command $S_r$ over time. With this configuration, when the host control device 100 intervenes in steering control, it is possible to reduce a rapid change in the final axial force $F_{sp}$.

In the first and second embodiments, the steering system 10 may include a clutch. In this case, as indicated by the long dashed double-short dashed line in FIG. 2, the steering shaft 12 and the pinion shaft 13 are connected via a clutch 21. The clutch 21 used herein is an electromagnetic clutch that connects and disconnects power through energization and de-energization of an exciting coil. The control device 50 performs engagement/disengagement control that switches between engagement and disengagement of the clutch 21. When the clutch 21 is disengaged, the power transmission path between the steering wheel 11 and the steered wheels 16 is mechanically disconnected. When the clutch 21 is engaged, the power transmission path between the steering wheel 11 and the steered wheels 16 is mechanically connected.

In the first embodiment, the axial force distribution calculation circuit 95 may calculate the final axial force $F_{sp}$ by adjusting the distribution rates $DR_1$ to $DR_4$ of the calculation circuits 101 to 104 in accordance with the distribution command $S_r$. For example, in the first embodiment, when the value of the flag serving as the distribution command $S_r$ is 1, the calculation circuit 101 for calculating the ideal axial force F1 sets the value of the distribution rate $DR_1$ to 1, and the calculation circuits 102 to 104 for calculating the estimated axial forces F2 to F4 set the values of the distribution rates $DR_2$ to $DR_4$ to 0. With this configuration, the same effects as those of the first embodiment can be obtained. Further, in the first embodiment, the calculation circuits 105 and 106 may be omitted from the axial force distribution calculation circuit 95. The same applies to the second embodiment and the third embodiment.

What is claimed is:

1. A steering control device configured to control a motor serving as a source of a driving force that is applied to a steering mechanism of a vehicle, based on a command value calculated in accordance with a steering state, the steering control device comprising:

an axial force calculation circuit configured to calculate a plurality of axial forces to be applied to a steered shaft, based on a plurality of state quantities, the axial force calculation circuit including:
an ideal axial force calculation circuit configured to calculate an ideal axial force to be applied to the steered shaft, based on the state quantities not reflecting a vehicle behavior or not reflecting road conditions; and
an estimated axial force calculation circuit configured to calculate an estimated axial force estimated to be applied to the steered shaft, based on the state quantities reflecting a vehicle behavior or road conditions; and
a distribution calculation circuit configured to calculate a final axial force to be reflected in the command value, by summing values obtained by multiplying the plurality of axial forces by individually set distribution rates, the distribution calculation circuit including:
a first calculation circuit configured to calculate a first axial force by multiplying the ideal axial force by a first distribution rate, the first calculation circuit setting the first distribution rate based on the distribution command,
a second calculation circuit configured to calculate a second axial force by multiplying a sum by a second distribution rate, the sum being calculated by summing values obtained by multiplying the ideal axial force and the estimated axial force by individually set distribution rates, the second calculation circuit setting the second distribution rate based on the distribution command, and
a third calculation circuit configured to calculate the final axial force by summing the calculated first axial force and the calculated second axial force; wherein
the distribution calculation circuit sets the distribution rates of the plurality of axial forces, based on a distribution command on the plurality of axial forces to be applied to the steered shaft that is generated by a host control device when the host control device intervenes in steering control.

2. The steering control device according to claim 1, wherein the distribution calculation circuit sets the distribution rate of the ideal axial force and the distribution rate of the estimated axial force such that only the ideal axial force is reflected in the final axial force, based on the distribution command.

3. The steering control device according to claim 1, wherein
the ideal axial force calculation circuit calculates the ideal axial force, based on a target rotation angle of a rotor that rotates in accordance with an operation of a steering wheel; and
the estimated axial force calculation circuit calculates the estimated axial force, based on at least one of a lateral acceleration, a yaw rate, or a current value of the motor, which is respectively detected by a sensor.

4. The steering control device according to claim 1, wherein the steered shaft is coupled to a steering wheel of the vehicle.

* * * * *